(12) United States Patent
Butera et al.

(10) Patent No.: US 11,730,308 B2
(45) Date of Patent: Aug. 22, 2023

(54) PROPORTIONAL EMULSION VALVE FOR FLUID TREATMENT MACHINES, IN PARTICULAR FOR THE PRODUCTION AND DELIVERY OF BEVERAGES

(71) Applicant: DOLPHIN FLUIDICS S.R.L., Corsico (IT)

(72) Inventors: Francesco Butera, Arese (IT); Stefano Avoledo, Villasanta (IT); Filippo Lucetti, Carrara (IT)

(73) Assignee: Dolphin Fluidics S.R.L., Corsico (IT)

( * ) Notice: Subject to any disclaimer, the term of this patent is extended or adjusted under 35 U.S.C. 154(b) by 521 days.

(21) Appl. No.: 16/884,466

(22) Filed: May 27, 2020

(65) Prior Publication Data

US 2020/0390269 A1 Dec. 17, 2020

(30) Foreign Application Priority Data

Jun. 11, 2019 (IT) .......................... 102019000008577

(51) Int. Cl.
*F16K 31/02* (2006.01)
*A47J 31/06* (2006.01)
(Continued)

(52) U.S. Cl.
CPC ....... *A47J 31/3614* (2013.01); *A47J 31/0605* (2013.01); *A47J 31/0615* (2013.01);
(Continued)

(58) Field of Classification Search
CPC ................ A47J 31/0605; A47J 31/0621; A47J 31/0615; A47J 31/46; F16K 31/002; F16K 31/02; F16K 31/025; F16K 17/06
See application file for complete search history.

(56) References Cited

U.S. PATENT DOCUMENTS 5,211,371 A * 5/1993 Coffee .................. F16K 31/025
  60/527
5,613,422 A * 3/1997 Giuliano ............... A47J 31/469
  99/295

(Continued)

FOREIGN PATENT DOCUMENTS

DE         20220348 U    6/2003
DE    102009033711 A1    1/2011
(Continued)

OTHER PUBLICATIONS

Search Report issued in counterpart Italian Patent Application No. 201900008577 dated Feb. 6, 2020, 2 pages.

*Primary Examiner* — Reginald Alexander
(74) *Attorney, Agent, or Firm* — Pearne & Gordon LLP

(57) ABSTRACT

The present invention relates to a proportional emulsion valve (1), configured to be used inside a fluid treatment machine, comprising a main body (2) in which an inlet duct (3) is defined, operatively connectable to the hydraulic circuit of a fluid treatment machine and configured to allow the entrance into said valve (1) of a fluid at a pressure higher than atmospheric pressure, and an outlet duct (4) operatively connectable to the hydraulic circuit of the machine and configured for the expulsion of the fluid from the valve (1), the inlet duct (3) and said outlet duct (4) being in fluid communication one another, the valve (1) comprising a slider (7) selectively positionable in an opening position, in which it allows the fluid communication between the inlet duct (3) and the outlet duct (4), and being selectively positionable, against the pressure exerted by a fluid when it is contained in the inlet duct (3), in a closing position in which the fluid communication between the inlet duct (3) and the outlet duct (4) is interrupted due to direct or indirect action of the slider (7), the slider (7) being operatively connected to an actuating system (9) comprising a driving (Continued)

element (10) configured to selectively exercise on the slider (7) a desired closing force (11) which tends to bring it towards the closing position; the driving element (10) is configured to exert the closing force (11) on the slider (7) through an elastic element (12) interposed between the driving element (10) and the slider (7) and configured to elastically force the slider (7) towards the closing position.

15 Claims, 4 Drawing Sheets

(51) Int. Cl.
- *A47J 31/36* (2006.01)
- *F16K 31/00* (2006.01)
- *A47J 31/46* (2006.01)
- *A47J 31/44* (2006.01)
- *F16K 17/06* (2006.01)

(52) U.S. Cl.
CPC ......... *A47J 31/3619* (2013.01); *F16K 31/002* (2013.01); *A47J 31/0621* (2013.01); *A47J 31/4496* (2013.01); *A47J 31/461* (2018.08); *F16K 17/06* (2013.01); *F16K 31/025* (2013.01)

(56) References Cited

U.S. PATENT DOCUMENTS

| | | | | |
|---|---|---|---|---|
| 5,865,418 | A * | 2/1999 | Nakayama | G05D 23/026 |
| | | | | 60/528 |
| 10,443,753 | B2 * | 10/2019 | van Beek | F25B 41/38 |
| 10,989,454 | B2 * | 4/2021 | Uribe | F16K 31/025 |
| 2016/0157669 | A1 | 6/2016 | Andreis | |

FOREIGN PATENT DOCUMENTS

| | | |
|---|---|---|
| EP | 0073739 A1 | 3/1983 |
| EP | 0542045 A1 | 5/1993 |
| IT | MI20131302 | 2/2015 |
| WO | 2015015370 A1 | 2/2015 |
| WO | 2016151507 A1 | 9/2016 |

* cited by examiner

PROPORTIONAL EMULSION VALVE FOR FLUID TREATMENT MACHINES, IN PARTICULAR FOR THE PRODUCTION AND DELIVERY OF BEVERAGES

BACKGROUND

The present invention relates to a proportional emulsion valve for fluid treatment machines, in particular but not exclusively machines for the production and delivery of beverages, such as for example espresso coffee.

As is known, in espresso coffee machines, said beverage is obtained by forcing the passage of hot water under pressure, typically in the order of 9 bars, through a layer of ground coffee powder. There are numerous ways in which pressure is generated and applied to the ground coffee layer.

In particular, it is known that the dynamic cycle for dispensing the beverage must be preceded by an initial static phase, since, before water begins to flow through the coffee powder, the ideal condition envisages that the whole layer of powder must be homogeneously wet to prevent the formation of "preferential paths" for the water itself. In the extraction process of the espresso coffee, this phase is commonly referred to as brewing, as the powder is macerated in water without a significant flow of the water itself.

To correctly carry out the brewing phase, devices and measures are used to ensure that hot water reaches the coffee powder without turbulences and with a gradual growth of the pressure front. Only in a second step, after an interval of not less than 5 seconds, the hot water thrust phase begins at the maximum pre-set pressure.

A technique for controlling the flow dispensing the beverage in a machine for the production of espresso coffee, especially in the brewing phase, consists of interposing a shut-off valve on the duct between the actual extraction chamber and the dispensing spout from which the beverage is poured into a suitable container (for example a cup).

With the spread of automatic coffee machines, it was also necessary to automate the operation of the shut-off valves. A very widespread technique is the one illustrated, for example, in the documents EP 0 073 739 A1 and EP 0 542 045 A1, where the initial blockage of the water flow, to allow an ideal brewing of the coffee pod, is made by a mechanical valve of the passive type, in which a spring opens when the thrust exerted by the pressure of the exiting coffee overcomes the force of the spring itself. A drawback of these mechanical valves of the passive type is due to the fact that it is not possible to simultaneously control the initial opening time and the dispensing pressure of the coffee infusion inside the extraction chamber. In fact, in order to delay the opening of the valve, it is necessary that the value of the thrust pressure is kept, for a desired period of time, lower than the pressure value which causes the valve shutter to open. Furthermore, during the extraction phase, the passage section through the shutter is not controlled, and depends on the thrust of the coffee passing through it.

To obviate these drawbacks, the solution described in the Italian patent number 1419244 is known, which shows a proportional valve, configured to be used inside a machine for the production and delivery of beverages, which comprises an actuating piston capable of selectively put an inlet duct in communication with an outlet duct; the piston is moved using an elastic actuator element manufactured with a shape memory material and an electric current generating device, operatively connected to the elastic actuator element in order to modify, in a progressive and modular way, the value of the elastic force exerted on the actuating piston, through a temperature variation induced by the passage of electric current inside the elastic actuator element.

This known solution has numerous advantages, but is not however completely satisfactory to guarantee a sufficient emulsion of the liquid outflowing from the valve.

The delivery of some beverages requires that the beverage be emulsified with air in order to generate a cream with desired characteristics. For example, in the case of espresso coffee, the quality of the coffee dispensed by an automatic machine is considered to be higher, the lower and denser the cream, and the finer the texture of the same, i.e. the narrower the meshes thereof, and the smaller are any air bubbles contained therein; the cream must also last for as long as possible.

In the known solution described in the Italian patent number 1419244, the coffee exits from the valve at a pressure higher than the atmospheric pressure, and therefore, at the exit from the dispensing spout of the machine, it expands, incorporating a certain amount of air and thus generating a cream; the dimensions of the air bubbles thus incorporated are however relatively large, and the cream that is generated has therefore rather large meshes, which tend to degrade rapidly, thus reducing the creaminess of the coffee.

BRIEF SUMMARY OF THE INVENTION

The main task of the present invention is therefore to provide a proportional emulsion valve for fluid treatment machines, in particular but not exclusively, machines for the production and delivery of beverages such as espresso coffee, which is capable of solving the above mentioned drawbacks of the prior art.

In detail, the task of the present invention is to provide a proportional emulsion valve for fluid treatment machines which guarantees the same performance as a proportional valve of the known type, and which allows at the same time to dispense a beverage, in particular coffee, obtaining an optimal creaminess, in which the cream has very small air bubbles, and therefore a very fine texture and high persistence over time.

Within the scope of this task, another object of the present invention is to provide a proportional emulsion valve for fluid treatment machines which guarantees to obtain, for different pressures of the liquid entering the valve, a desired emulsion with air of the exiting liquid.

Another object of the present invention is to provide a proportional emulsion valve for fluid treatment machines which allows obtaining a very precise and continuous adjustment of the opening/closing degree thereof.

The above mentioned task and objects are achieved by providing a proportional emulsion valve for fluid treatment machines, in particular, but not exclusively, machines for the production and delivery of beverages, such as for example espresso coffee, as set forth in claim 1.

Further characteristics of the invention are highlighted by the dependent claims, which are an integral part of the present description.

A further aspect of the invention is the method by which the valve is used, set forth in claim 12; further advantageous aspects of this method are set forth in the claims depending on the latter.

BRIEF DESCRIPTION OF THE DRAWINGS

The characteristics and advantages of a proportional emulsion valve for fluid treatment machines according to the present invention, and of the method for the use thereof, will become more evident from the following exemplified but non-limiting description, referring to the accompanying schematic drawings in which.

DESCRIPTION

Figure 1:
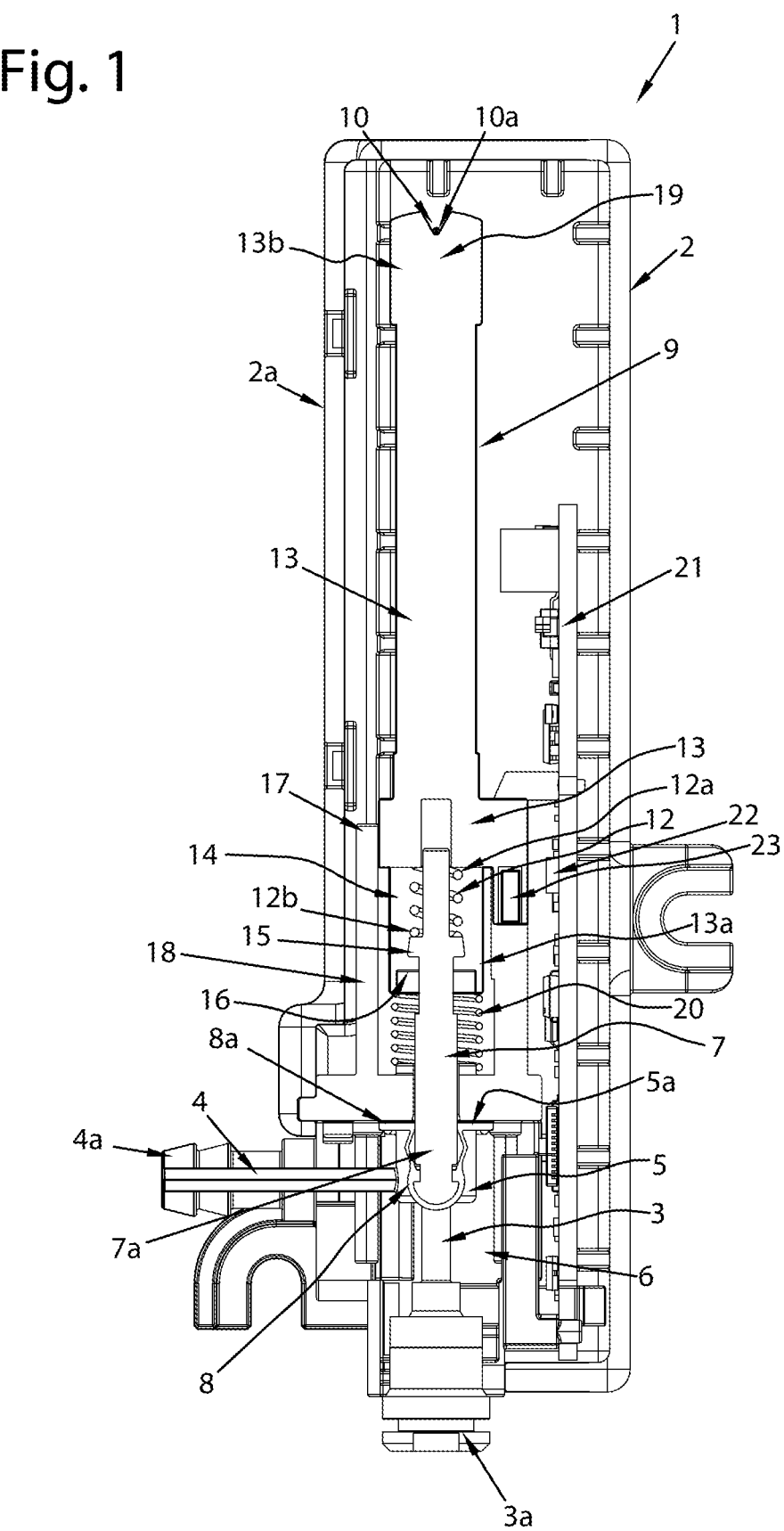
FIG. 1 is a side sectional view of an embodiment of a proportional emulsion valve for fluid treatment machines according to the present invention, in the closed condition.

In the accompanying figures, the numeral 1 indicates as a whole a proportional emulsion valve according to the invention, configured to be used in fluid treatment machines, not illustrated, in particular but not exclusively, machines for the production and delivery of beverages, such as for example espresso coffee.

The fluid can consist of, for example, a coffee infusion, which enters the proportional emulsion valve 1 coming from the dispensing chamber of the relative machine, and exits the proportional emulsion valve 1 itself to be sent to a dispensing spout of the machine; in this case, the proportional emulsion valve 1 therefore operates as a brewing valve.

The valve 1 comprises a main body 2, in which an inlet duct 3 is defined, operatively connectable to the hydraulic circuit, not illustrated, of a fluid treatment machine, and configured to allow the entrance into said proportional emulsion valve 1 of a fluid at a pressure higher than the atmospheric pressure.

Advantageously, the main body 2 comprises a plug or other inlet fitting 3a, adapted to connect the inlet duct 3 with the hydraulic system (for example, preferably, with a piping or duct thereof) of a fluid treatment machine.

The main body 2 further comprises an outlet duct 4, operatively connectable to the hydraulic circuit (for example, preferably, with a piping or duct thereof) of a fluid treatment machine and configured for the expulsion of fluid from the valve 1.

Advantageously, the main body 1 comprises a plug or other outlet fitting 4a, adapted to connect the outlet duct 4 with the hydraulic system of a fluid treatment machine.

The inlet duct 3 and the outlet duct 4 are in fluid communication one another, preferably through a connecting chamber 5, advantageously included in the main body 2.

In the embodiment illustrated in the accompanying figures, the main body 2 advantageously comprises a hollow box-like body 2a, preferably made of plastic, more preferably obtained by joining two half-shells.

Advantageously, the box-like body 2a encloses at least partially a monoblock 6, preferably made of plastic, in which the inlet duct 3, the outlet duct 4, the plug or other inlet fitting 3a, the plug or other outlet fitting 4a and the connecting chamber 5 are advantageously formed.

The valve 1 comprises a slider 7, preferably at least partially inserted and movable with alternating motion in the connecting chamber 5, advantageously through an access opening 5a formed in the latter.

Figure 2:
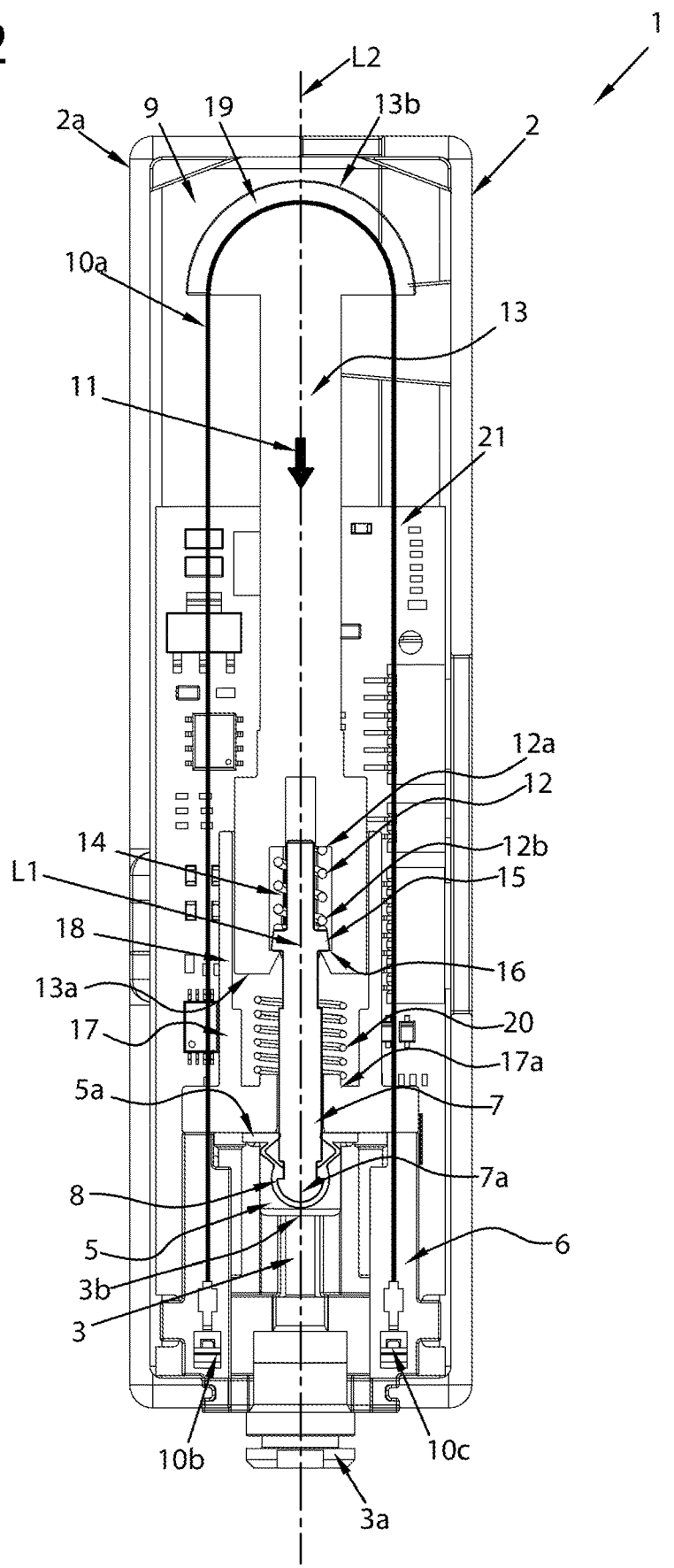
FIG. 2 is a front section view of the valve of FIG. 1, in the open condition.

The slider 7 is selectively positionable in an opening position, illustrated for example in FIG. 2, wherein the same allows the fluid communication between the inlet duct 3 and the outlet duct 4; in this opening position, a pressurized liquid, such as for example a coffee infusion, which enters the valve 1 through the inlet duct 3, passes into the connecting chamber 5 (if provided), and then exits the valve 1 through the outlet duct 4.

The slider 7 is also selectively positionable, against the pressure exerted by a fluid when it is contained in the inlet duct 3, in a closing position, illustrated for example in FIGS. 1 and 3, in which the fluid communication between the inlet duct 3 and the outlet duct 4 is interrupted due to direct or indirect action of the slider 7; as will be better explained below, in this closing position the slider 7, opposing the force exerted by any pressurised fluid contained in the inlet duct 3, which tends to let this liquid outflow from the inlet duct 3 to bring it to the outlet duct 4 (through the connecting chamber 5, if provided), prevents said fluid from passing to the outlet duct 4, for example by directly blocking the inlet duct 3 itself, or by moving in turn a further element, such as for example a gasket, until it is positioned so as to block the inlet duct 3.

Advantageously, like in the embodiment illustrated in the accompanying figures, the slider 7 can move with alternating linear motion; in a further advantageous embodiment, not shown, the slider 7 can move with an alternating circular motion, or with an alternating motion according to a desired direction (for example a combination of linear and circular motion).

Advantageously, like in the embodiment illustrated in the accompanying figures, the slider 7 is movable with alternating linear motion in the direction of its longitudinal axis L1. In a preferred embodiment, the slider 7 is a first piston, with elongated conformation.

In an advantageous embodiment, such as the one illustrated in the accompanying figures, the access opening 5a is facing the end 3b of the inlet duct 3 which communicates with the connecting chamber 5; in this advantageous embodiment, the slider 7, implemented as a first piston, is advantageously arranged with its longitudinal axis L1 positioned along the direction which joins the centre of the end 3b of the inlet duct 3 with the centre of the access opening 5a, so that in its alternating linear motion it approaches or moves away from said end 3b, varying its degree of insertion into the connecting chamber 5.

In an advantageous embodiment, such as for example the one illustrated in the accompanying figures, the valve 1 comprises a gasket 8, elastically deformable, configured to avoid the leakage of fluid from the connecting chamber 5 via the access opening 5a, and at the same time to fully wrap the portion 7a of the slider 7 which enters the connecting chamber 5, elastically deforming until being interposed between the slider 7 and the end 3b of the inlet duct 3 communicating with the connecting chamber 5, when the slider 7 is in the closing position, so as to watertight close the aforesaid end 3b, and watertight blocking the passage of fluid from the inlet duct 3 to the connecting chamber 5.

In the closing position, the slider 7 is therefore advantageously inserted in the connecting chamber 5 for a stretch so as to push the gasket 8 against the end 3b of the inlet duct 3, so as to watertight close it again; in this advantageous embodiment, the slider 7 therefore interrupts the fluid communication between the inlet duct 3 and the outlet duct 4 "due to indirect action", i.e. by means of the gasket 8.

In a further advantageous embodiment, not shown, in the absence of the gasket 8, the slider 7, provided or not with a further gasket integrated thereto, engages directly, in the closing position, with the end 3b of the inlet duct 3, so as to watertight close it again, thus interrupting "due to direct action" (i.e. without the aid of further elements) the fluid connection between the inlet duct 3 and the outlet duct 4.

Figure 4:
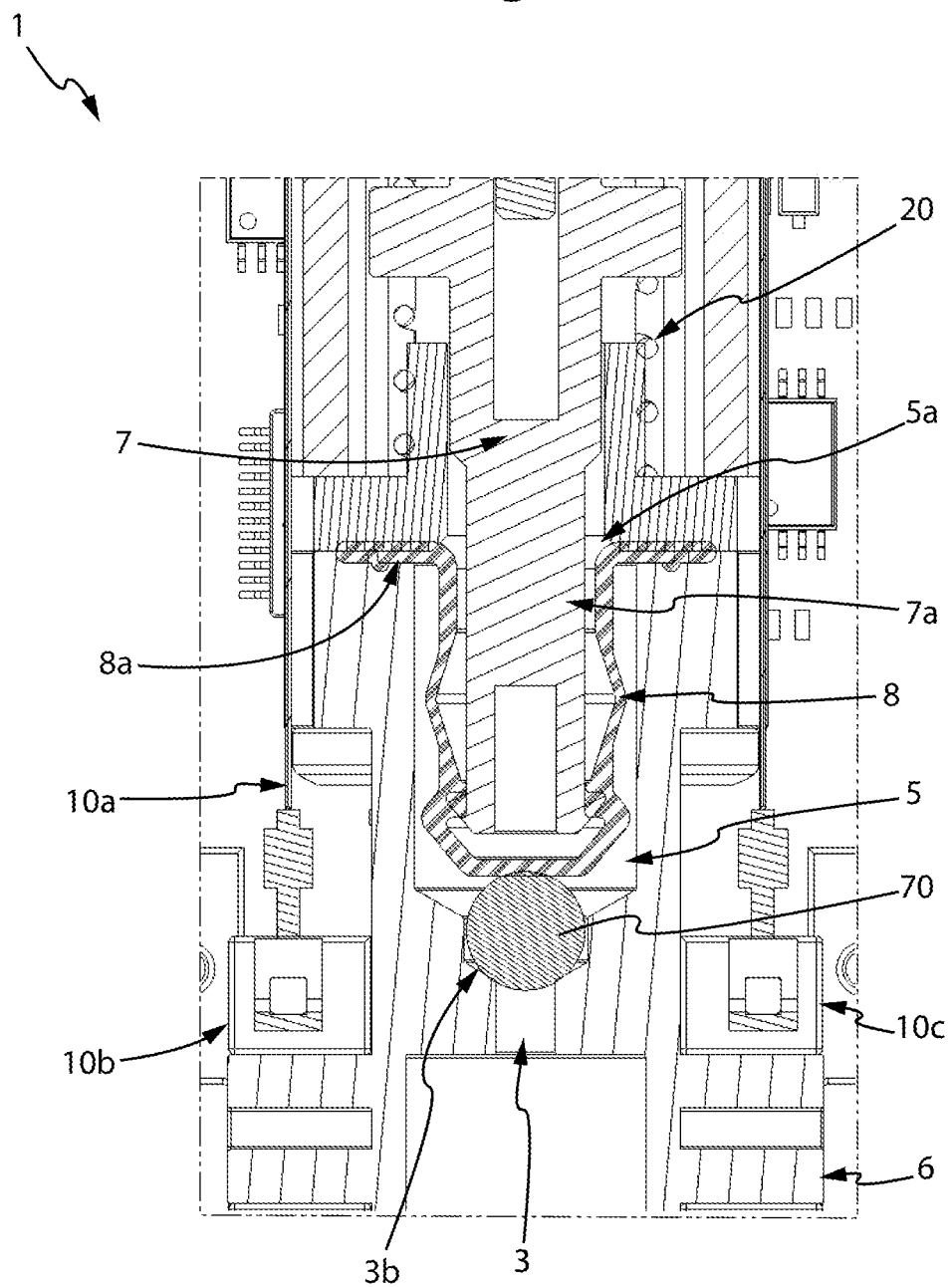
FIG. 4 is a front section view of a variant of the valve of the previous figures, in the closed condition.

Advantageously, as illustrated in particular in the variant of the valve 1 illustrated in FIG. 4, the slider 7 comprises a shutter body 70, preferably spherical in shape, separated from the portion 7a of the slider 7 which enters the connecting chamber 5, and interposed between said portion 7a and the inlet duct 3.

Advantageously, the shutter body 70 engages directly, in the closing position of the slider 7, with the end 3b of the inlet duct 3, so as to watertight close it again, thus interrupting the fluid connection between the inlet duct 3 and the outlet duct 4.

As illustrated in FIG. 4, the gasket 8, elastically deformable, is configured to avoid the leakage of fluid from the connecting chamber 5 via the access opening 5a, and at the same time to fully wrap the portion 7a of the slider 7 which enters the connecting chamber 5, elastically deforming until pushing the shutter body 70 against the end 3b of the inlet duct 3 communicating with the connecting chamber 5, when the slider 7 is in the closing position, so as to watertight close the aforesaid end 3b, and watertight blocking the passage of fluid from the inlet duct 3 to the connecting chamber 5.

Advantageously, the slider 7 and the shutter body 70 both have a portion made of a ferromagnetic material of which at least one portion of said two portions is permanently magnetized. In this way the shutter body 70 is magnetically attracted by the slider 7.

In the embodiment illustrated in the accompanying figures, the gasket 8 advantageously has a dome shape, preferably with the side surface shaped as bellows, so as to facilitate its extension during the movement of the slider 7 towards the inside of the connecting chamber 5. Preferably the gasket 8 has a cross section like an "inverted $\Omega$".

Advantageously, the base 8a of the gasket 8 is at least partially counter-shaped and sealed to the perimeter of the access opening 5a to the connecting chamber 5, so as to seal said access opening 5a again, and to avoid the leakage of fluid through the same.

Thanks to the gasket 8, the connecting chamber 5 is hydraulically isolated both from the slider 7 and from the outside of the access opening 5a; more generally, the inside of the connecting chamber 5 is hydraulically isolated from what is external to the access opening 5a, thus avoiding the formation of any deposits and/or incrustations on the mechanical and electronic components of the valve 1 (including, precisely, the slider 7) which allow the actuation thereof, and which are positioned outside the connecting chamber 5.

Advantageously, the slider 7 is operatively connected to an actuating mechanism, generally indicated as a whole by number 9, comprising a driving element 10 configured to selectively exert a desired closing force on the slider 7 which force tends to bring the same (for example pushes it) into the closing position.

Figure 3:
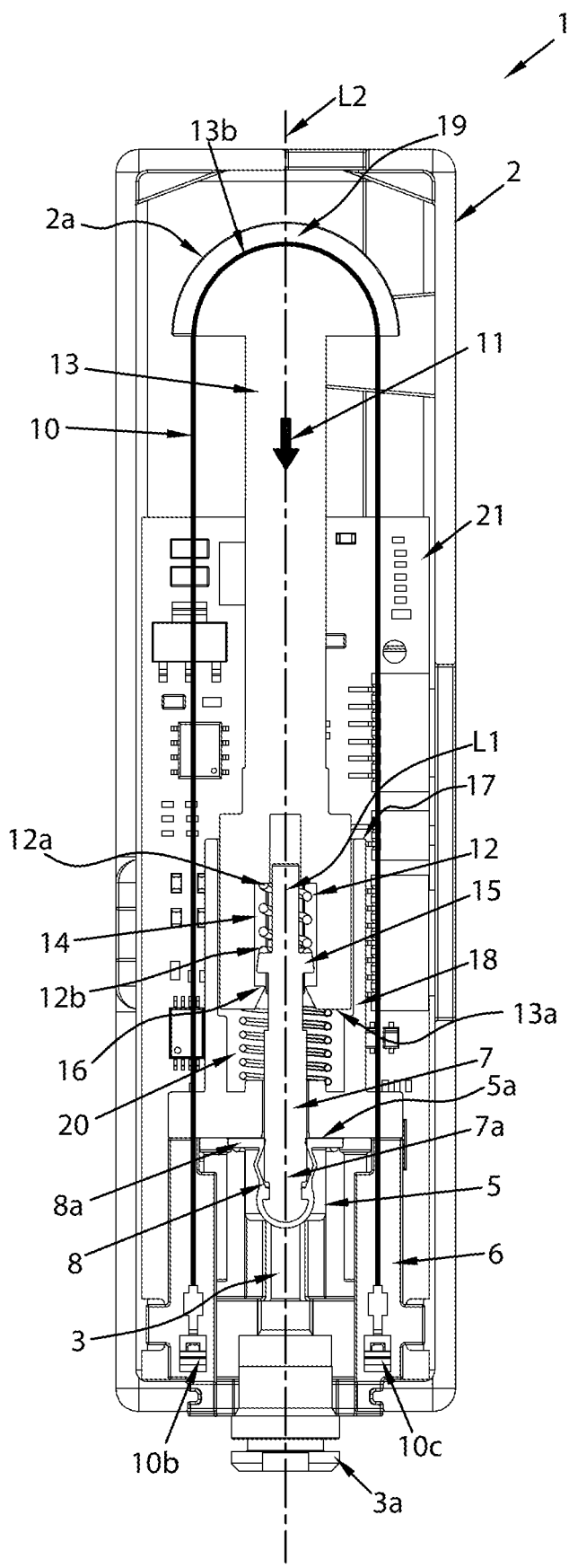
FIG. 3 is a front section view of the valve of the previous figures, in the closed condition.

Advantageously, like in the embodiment illustrated in the accompanying figures, in which the slider 7 moves with alternating linear motion, the closing force, illustrated schematically in FIGS. 2 and 3 with an arrow 11, advantageously has a direction parallel to the axis of movement of the slider 7 (which coincides with the longitudinal axis L1 of the same), and is directed in the direction of insertion of the slider 7 into the connecting chamber 5.

Advantageously, the driving element 10 is or comprises at least one actuator element manufactured with a shape memory alloy or "SMA" and configured to selectively exert on the slider 7 the desired closing force 11, depending on the shape and/or size of the actuator element 10 itself; the actuating system 9 further comprises an electric current generating device, not illustrated, operatively connected to the actuator element 10 to selectively modify its shape and/or size through a temperature variation induced by the passage of electric current inside the actuator element.

In a preferred embodiment, such as for example the one illustrated in the accompanying figures, the actuator element 10 consists of or comprises an actuating wire 10a manufactured with an alloy of shape memory materials. The actuating wire 10a is advantageously provided with a first point 10b of constraint to the main body 2, and a second point 10c of constraint to the main body 2; the wire 10a is then connected to the slider 7, directly or through a further body or mechanical system, in an intermediate position between the first and the second constraint point, so that the variation in size or shape (the example illustrated in the accompanying figures shows advantageously a reduction in length of the wire 10a, due to the heating by Joule effect generated by the electric current flowing in the wire) of the portion of wire 10a comprised between the two constraint points 10b and 10c, generates the closing force 11 on the slider 7.

In a further embodiment, not shown in the accompanying figures, the actuator element can consist of a helical torsion spring, operating for example by compression, provided with a first point of constraint to the main body 2, and a second point of constraint to the slider 7 or to a body or mechanical system mechanically connected to the slider 7, so as to be able to transmit the closing force 11 to the slider, directly or through the body or mechanical system.

As will be better explained below, the driving element 10 is configured to exert the closing force 11 on the slider 7 through an elastic element 12, interposed between the driving element 10 and the slider 7, and configured to elastically force (for example to push) the slider 7 towards the closing position.

In an advantageous embodiment, such as for example the one illustrated in the accompanying figures, in which the slider 7 is a first piston which moves with alternating linear motion in the direction of its longitudinal axis L1, the actuating system 9 comprises a second piston 13, at least partially inserted in the main body 2 and movable with alternating linear motion with respect to the same, according to the same axis of movement of the first piston (i.e. the slider 7).

Advantageously, the second piston 13 slidingly supports the slider 7 in such a way that the latter can move in an alternating linear motion with respect to the second piston 13, always in the direction defined by its longitudinal axis L1; in a preferred embodiment, the second piston 13 comprises, at its first end 13a, facing the connecting chamber 5, a cavity 14, within which the slider 7 is partially inserted and movable with alternating linear motion.

Advantageously, the elastic element 12 is interposed between the slider 7 and the second piston 13.

Advantageously, the driving element 10 is configured to selectively exert the desired closing force 11 on the second piston 13; said closing force 11 is transmitted from the second piston 13 to the slider 7 through the elastic element 12.

In an advantageous embodiment, such as for example the one illustrated in the accompanying figures, the actuator element advantageously consists of an actuating wire 10a manufactured with an alloy of shape memory materials, constrained at its ends to the main body 2, preferably to the monoblock 6, and associated, in an intermediate region thereof, with a second end 13b of the second piston 13; preferably the actuating wire 10a is positioned in a seat 19 formed at the second end 13b of the second piston 13. The passage of electric current in the wire 10a causes its heating by Joule effect, and the heating tends to reduce the length of the wire which, being constrained at its ends, in order to be able to reduce its length pushes the second piston 13 towards the connecting chamber 5.

Preferably, the second end 13b of the second piston 13 in which the seat 19 is formed, has a semi-cylindrical conformation with a rotation axis perpendicular to the longitudinal axis L2 of the second piston 13 (which in the illustrated example coincides with the longitudinal axis L1 of the slider 7).

Advantageously, in a preferred embodiment, such as for example the one illustrated in the accompanying figures, the elastic element 12 is or comprises a helical torsion spring operating by compression.

In an advantageous embodiment, such as for example the one illustrated in the accompanying figures, in which the valve 1 comprises a second piston 13, and the slider 7 is implemented as a first piston partially inserted, and movable with alternating linear motion, in the cavity 14 of said second piston 13, the torsion spring 12 is preferably wound around the end of the first piston 7 inserted in the cavity 14, and has a first end 12a, placed in abutment against the bottom either of the cavity 14, or against an abutment formed in the latter, and a second end 12b, placed in abutment against an appendix 15 projecting transversely, preferably radially, from the lateral surface of the first piston 7.

Advantageously, the valve 1 comprises limit stop means suitable for limiting the movement of the slider 7 with respect to the second piston 13 in the direction of the closing force 11; in an advantageous embodiment, said limit stop means can advantageously comprise a stopping abutment 16 formed at the open end of the cavity 14 of the second piston 13, suitable for engaging with the appendix 15 of the slider 7, to avoid the total exit of the latter from cavity 14.

Preferably, said limit stop means are also configured in such a way as to engage with the slider 7 during the movement of the second piston 13 in the direction away from the connecting chamber 5, so as to drag the slider 7 integrally with the second piston 13 and move the slider 7 away from the closing position, bringing it into the opening position.

In a preferred embodiment, wherein the valve 1 comprises the second piston 13, the same can advantageously also comprise a hollow cylinder 17, within which the second piston 13 is at least partially supported and moves with an alternating linear motion. In an advantageous embodiment, such as for example the one illustrated in the accompanying figures, the cylinder 17 is defined in a head 18 fixed within the main body 2, preferably, if present, to the monoblock 6. Advantageously, the cylinder 17 is made of plastic.

Advantageously, the actuating system 9 comprises at least one elastic contrast element 20, configured to exert on the slider 7, directly or indirectly, an opening force which tends to move the slider 7 away from the closing position, and bring it into the opening position, thus allowing the fluid connection between the inlet duct 3 and the outlet duct 4.

In an advantageous embodiment, such as for example the one illustrated in the accompanying figures, wherein the valve 1 comprises a second piston 13, and the slider 7 is implemented as a first piston slidingly supported by the second piston 13, and movable with alternating linear motion with respect to the latter, the elastic contrast element 20 is configured to interact with the second piston 13 and push the same in a direction such as to move the slider/first piston away from the closing position, and bring it into the opening position.

In a preferred embodiment, such as the one illustrated in the accompanying figures, the elastic contrast element 20 advantageously consists of, or comprises, a helical torsion spring operating by compression, preferably arranged inside the cylinder 17 within which the second piston 13 slides, and interposed between the bottom 17a of the internal cavity of the cylinder 17 (or a suitable abutment formed in said cavity), and the first end 13a of the second piston 13.

Advantageously, the helical torsion spring 20 is sized and positioned in such a way as to generate and exert on the second piston 13, when it is compressed by the same towards the bottom 17a of the internal cavity of the piston 17, an opening force, having the same direction as the closing force 11, but with opposite direction.

This opening force, in the absence of the closing force 11, causes the second piston 13 to move away from the connecting chamber 5 and the relative movement of the slider 7 with respect to the second piston 13, due to the action of the elastic element 12, towards the stopping abutment 16 formed at the open end of the cavity 14 of the second piston 13; when the appendix 15 of the slider 7 abuts against the stopping abutment 16, the slider 7 cannot further exit from the cavity 14, and is dragged by the same in the direction of motion of the second piston 13, and thus moving away from the closing position.

Advantageously, the valve 1 comprises an electronic control board 21, preferably positioned in the main body 2, more preferably inside the box-like body 2a of the same, configured to control the electrical and/or electronic components of the valve 1.

Advantageously, the electronic control board 21 is configured to control the electric current generating device operatively connected to the actuator element 10.

Advantageously, the valve 1 further comprises means for detecting a quantity correlated to the position of the slider 7 with respect to the closing position and/or correlated to the closing force 11 exerted by the driving element 10 on the slider 7.

In a preferred embodiment, such as for example the one illustrated in the accompanying figures, wherein the valve 1 comprises a second piston 13, and the slider 7 is implemented as a first piston slidingly supported by the second piston 13, and movable with alternating linear motion with respect to the latter, the means for detecting a quantity correlated to the position of the slider 7 with respect to the closing position and/or correlated to the closing force 11 exerted by the driving element 10 on the slider 7 comprise means for detecting the position of the second piston 13 with respect to the main body 2, and in particular with respect to the connecting chamber 5.

Advantageously, said means for detecting the position of the second piston 13 with respect to the main body 2 can comprise a sensor, more preferably a Hall effect sensor 22, even more preferably mounted on the electronic control board 21 (which is integral with the main body 2), advantageously configured to detect the position of a magnet 23 mounted on the second piston 13 and integral therewith. Advantageously, in the embodiment illustrated in the accompanying figures, the magnet 23 is fixed to a region of the piston 13 external to the cylinder 17, preferably to an appendix projecting from the lateral surface of the piston 13.

In a further advantageous embodiment, the position of the second piston 13 with respect to the main body 2 can be detected by other types of sensors, such as for example optical, capacitive, induction, resistive sensors, etc.

In a further advantageous embodiment, not shown, the position of the second piston 13 with respect to the main body 2 can be detected indirectly, without using dedicated sensors, for example by measuring the electrical resistance of the wire 10a, from which it is possible to obtain its length, and therefrom the position of the second piston 13 with respect to the main body 2 to which the wire 10a is constrained at its ends 10c and 10d.

Advantageously, the electronic board 21 is configured to detect the position of the second piston 13, preferably, if present, by means of the sensor 22, and consequently control, preferably on the basis of a closed-loop control, the electric current generating device operatively connected to the actuator element 10, so as to generate (by regulating the generated current) the desired closing force 11 on the second piston 13 which is transmitted, through the elastic element 12, to the slider 7.

Advantageously, the electronic control board 21 comprises a wireless remote communication module, not illustrated, adapted to allow it to communicate and/or be controlled and/or programmed and/or monitored from the outside of the valve 1, through an electronic device such as, for example, a computer, a smartphone, a tablet, a PLC, a further electronic board (for example the electronic control board of a machine for the production and delivery of beverages, in which the valve 1 is mounted), etc.

In a further advantageous embodiment, not shown, as an alternative, or in addition, to a wireless communication module, the electronic control board 21 can exchange analogue and/or digital signals (the latter for example through a bus communication, not shown) through a connection that is wired to an electronic device, external to the valve 1, for the control and/or monitoring of the electronic control board 21, and therefore of the valve 1.

The operation of the valve 1 according to the invention will be described below.

In a stand-by condition, i.e. in the absence of electric current sent to the actuator element 10 made of memory shape material, and therefore of closing force 11, the valve 1 is kept normally open due to the action of the elastic contrast element 20, which pushes the second piston 13, if present, and therewith the slider 7, in a direction opposite to the connecting chamber 5.

The open configuration of valve 1 is shown in FIG. 2.

When the valve 1 must be closed, for example during the brewing phase of the process of delivery of coffee in a machine for the production and delivery of espresso coffee, the electric current generator is activated, for example by the electronic control board 21, so that a desired electric current flows into the actuator element 10, made of a memory shape material, heating it by Joule effect; the heating causes, as explained, a variation in the size and/or shape of the actuator element 10, which generates a closing force 11 on the second piston 13, which pushes the same towards the connecting chamber 5.

The second piston 13, and therewith the elastic element 12, then begin to move towards the connecting chamber 5; the elastic element 12 transmits the closing force 11 from the second piston 13 to the slider 7, which therefore also moves towards the end 3b of the inlet duct 3 communicating with the connecting chamber 5.

As the slider 7 moves on inside the connecting chamber 5 towards the end 3b, the gasket 8 elastically deforms, until at a certain point it comes into contact with the end 3b, watertight closing the latter again; from this point onwards, as the second piston 13 moves on towards the connecting chamber 5, the elastic element 12 is compressed, exerting a gradually increasing closing force on the slider 7, which pushes it towards the end 3b of the inlet duct 3, opposing the pressure of the liquid contained in the inlet duct 3, and therefore keeping the end 3b stably watertight closed.

If the shutter body 70 is provided, like in the variant of FIG. 4, as the slider 7 moves on inside the connecting chamber 5 towards the end 3b, the gasket 8 elastically deforms, until at a certain point it comes into contact with the shutter body 70, being first free to move away with respect to the end 3b of the inlet duct 3, pushing it against the latter in a watertight manner.

When the shutter body 70 is not kept pushed against the end 3b of the inlet duct 3, a minimum pressure of the fluid entering the inlet duct 3 is sufficient to allow it to detach from the end 3b and therefore the fluid to enter the connecting chamber 5.

If the shutter body 70 has the characteristic of being magnetically attracted by the slider 7, raising the slider 7 away from the end 3b of the inlet duct 3 allows dragging the shutter body 70 moving it away from the end 3b, and keeping it in a position spaced from the same.

Advantageously, the final position that the second piston 13 must take on in the closed condition of the valve 1 is preset according to the pressure of the fluid contained in the inlet duct 3, so that, in this final position, the elastic element 12 is preloaded (that is, in the advantageous example illustrated in the accompanying figures, is compressed) by a magnitude such that the elastic force generated by it, which tends to bring the slider 7 into the closing position, exceeds the force generated by the pressure of said fluid, which tends to move the slider 7 away from the closing position.

Under this closed condition, a pressurised fluid cannot therefore leak from the inlet duct 3, and therefore remains confined within the same.

This situation occurs, for example, during the brewing phase in a machine for the production and delivery of espresso coffee, in which the liquid upstream of the valve 1 is kept at a certain pressure, for example 5 bar, for a predefined time, preferably in an interval comprised between 5 and 7 seconds, so as to allow the fibres of the coffee powder to absorb water.

Advantageously, the pressure of the fluid present in the inlet duct 3 in this first phase can be measured, for example, by means of a suitable sensor, or by means of an indirect measuring means, internal or external to the valve 1; advantageously the data on the pressure of the fluid contained in the inlet duct 3 can then be communicated to the electronic control board 21, or other control device, internal or external to the valve 1, which controls the electric current generator of the valve 1 in a such a way that this generates a current such that the second piston 13 moves to the preset final position which the same must take on in the closed condition of the valve 1 to ensure that the elastic force generated by the elastic element 12 exceeds the force generated by the measured pressure value of the fluid in the inlet duct 3.

In a further advantageous embodiment, the pressure value of the fluid in the duct 3 is not measured, but for example estimated or assumed equal to a determined characteristic value of a certain phase of the process of production and delivery of the fluid (for example in the brewing phase it could be taken into account that the fluid pressure is 5 bar); in this case, the electronic control board 21, or other control device, internal or external to the valve 1, controls the electric current generator of the valve 1 in a such a way that this generates a current such that the second piston 13 moves to the preset final position which the same must take on in the closed condition of the valve 1 to ensure that the elastic force generated by the elastic element 12 exceeds the force generated by the estimated or assumed pressure value of the fluid in the inlet duct 3. When it is wished to open the valve 1, for example, in the case of a machine for the production and delivery of espresso coffee, after the brewing phase, the electric current delivered to the memory shape actuator element 10 can be varied (for example reduced), so as to reduce the closing force 11 generated by the latter.

By varying the current, and therefore the temperature, the second piston 13, pushed by the elastic contrast element 20 and by the pressure of the liquid present in the inlet duct 3, which is transmitted to the second piston 13 through the slider 7 and the elastic element 12, moves then away from the connecting chamber 5 for a certain stretch, at least partially discharging the elastic element 12; consequently, the force exerted by said elastic element 12 on the slider 7 is reduced.

By suitably adjusting (acting on the current, as previously described) the position of the second piston 13 in relation to the pressure of the fluid contained in the inlet duct 3 (which can be constant, or can be modified, for example increased, during the delivery phase of the fluid), which can for example be measured, or estimated, or assumed depending on the specific phase of the process of production and delivery of the fluid, it is possible to discharge the elastic element 12 by a magnitude such that the force exerted by the same on the slider 7 is no longer able to overcome the force exerted by the fluid contained in the inlet duct 3.

In this condition, the slider 7 is then moved away from the closing position, and the fluid flows out of the inlet duct 3, entering the connecting chamber 5, and out of it, flows out of the outlet duct 4.

Once the fluid flows out of the inlet duct 3, its pressure is reduced, reducing the force exerted on the slider 7; at the same time, the elastic element 12 is compressed by the retraction of the slider 7 towards the second piston 13, whereby the force exerted by said elastic element 12 on the slider 7 increases.

A suitable adjustment of the position of the second piston 13 (obtained for example in the ways described above) ensures that under this condition the slider 7 goes back to the closing position; at this point, the pressure of the fluid in the inlet duct 3, closed by the slider 7, starts rising again, while the force exerted by the elastic element 12, which is less compressed, is reduced, bringing the slider 7 back into the opening position.

An unstable equilibrium condition is therefore created between the force exerted on the slider 7 by the elastic element 12 and the force generated by the pressure of the fluid present in the inlet duct 3 which persists throughout the phase of delivery of the fluid, and which brings about a continuous oscillation of the slider 7 between the closing and opening positions.

Said oscillation causes a pulsed delivery of the fluid through the outlet duct 4, which favours the emulsion, and the formation, in the dispensed liquid, of a cream, and in particular of a cream with a very fine texture, and persistent over time.

Thanks to the dynamic control of the position of the second piston 13, carried out advantageously, in the embodiment described, thanks to the Hall effect sensor 22, but also being possible with different types of sensor, and/or by measuring the electrical resistance of the wire 10a, it is therefore possible to control in a very precise and effective way the closing state of the valve 1 and the oscillation state of the slider 7 between the opening and closing position, adapting to the different values of the (measured, estimated, or assumed) pressure of the fluid that can be contained in the inlet duct 3.

In other words, the dynamic control of the position of the second piston 13 allows varying the preload of the elastic element 12 so that the slider 7 can oscillate, and therefore emulsify the fluid, at different pressures of fluid delivery.

Thanks to the sensor 22 (or, as an alternative or in addition, by means of a different type of sensor and/or by measuring the electrical resistance of the wire 10a), the electronic control board 21 can learn at any time the position of the second piston 13, and, acting on the current delivered to the actuator element 10 (for example by means of a suitable train of impulses of the current delivered by the electric current generator), adapt the closing force 11 in such a way to position the second piston 13 in a desired position, so as to dynamically guarantee the desired preload degree of the elastic element 12, and therefore the desired flow rate of the exiting liquid, as well as the desired vibration of the slider 7.

Advantageously, the current delivered to the actuator element 10, and therefore the closing force 11 and the position of the second piston 13 with respect to the main body 2, can be controlled according to various parameters, such as for example the pressure and/or the flow and/or the temperature of the fluid, obtained preferably by means of sensors external to the valve 1 and connected to the electronic control board 21 thereof, for example by means of the wireless connection module and/or by means of a wired communication system; in this way it is possible to control the dynamics of the valve 1 so as to optimize the quality of the dispensed beverage.

The valve 1 can be returned to stand-by conditions by interrupting the delivery of electric current to the actuator element 10. As previously explained, the elastic contrast element 20 causes the second piston 13 to move away from the connecting chamber 5 and the relative movement of the slider 7 with respect to the second piston 13, due to the action of the elastic element 12, towards the stopping abutment 16 formed at the open end of the cavity 14 of the second piston 13; when the appendix 15 of the slider 7 abuts against the stopping abutment 16, the slider 7 is dragged by the same in the direction of motion of the second piston 13, and therefore moves away from the closing position.

It has thus been seen that the proportional emulsion valve for fluid treatment machines according to the present invention achieves the task and objects previously highlighted, making it possible in particular to guarantee the same performances of a known proportional valve, and at the same time, thanks to the vibration between the opening and closing positions to which the slider is subject during the delivery, to dispense a beverage, in particular espresso coffee, which has an optimal creaminess, in which the cream has air bubbles of very small dimensions, and therefore a very fine texture and a high persistence over time.

Furthermore, the valve according to the invention, thanks to the possibility of dynamically adjusting the closing force, allows to obtain the desired degree of emulsion in the dispensed beverage, adapting to the pressure value of the fluid in the inlet duct.

Furthermore, the valve according to the invention is dimensionally compact and geometrically simple, and has negligible masses and a low heat transfer coefficient, so as not to impact on the temperature of the beverage.

The use of shape memory materials allows to exert considerable actuating forces, which also make the proportional valve more resistant to frictions generated by the deposits and incrustations of the beverage.

Thanks to the means for detecting a quantity correlated to the position of the slider with respect to the closing position and/or correlated to the closing force exerted by the driving element on the slider, it is possible to adjust the opening/closing degree of the valve continuously, with precision and reliability.

Thanks to the wireless remote communication module, the valve can be easily controlled and/or programmed and/or monitored from the outside of it, through an external electronic device such as, for example, a computer, a smartphone, a tablet, a PLC, a further electronic board (for example the electronic control board of a machine for the production and delivery of beverages, in which the valve is mounted); unlike a wired connection, said type of connection does not need to restore the hydraulic seals at the cable leadthroughs, for example through the main body of the valve, and, not requiring wired electrical connections in addition to those necessary for the power supply, it also facilitates the installation of the valve inside a fluid treatment machine.

Said type of connection also facilitates the exchange of data between the valve, and in particular the electronic control board of the same, with sensors, internal or external to the same, indicating the fundamental parameters of the managed fluid, such as pressure, temperature, flow, etc. Said data exchange is however possible by using, as an alternative or in addition to the wireless communication module, also a data bus with a wired connection.

Furthermore, thanks to the gasket that avoids the leakage of fluid from the connecting chamber and at the same time fully wraps the portion of the slider that enters this connecting chamber, the inside of the latter is hydraulically isolated from what is external to the access opening thereof, thus avoiding the formation of deposits and/or incrustations of fluid on the mechanical and electronic components of the valve (including, precisely, the slider) which allow the actuation thereof.

The proportional emulsion valve for fluid treatment machines according to the present invention is susceptible in any case to numerous modifications and variations, all of which are within the same inventive concept; moreover, all the details can be replaced by technically equivalent elements. The materials used, as well as the shapes and dimensions, may in practice be of any type according to the technical requirements.

The invention claimed is:

1. Proportional emulsion valve, configured to be used inside a fluid treatment machine, comprising a main body in which an inlet duct is defined, operatively connectable to a hydraulic circuit of a fluid treatment machine and configured to allow entrance into said valve of a fluid at a pressure higher than atmospheric pressure, and an outlet duct operatively connectable to said hydraulic circuit of said machine and configured for expulsion of said fluid from said valve, said inlet duct and said outlet duct being in fluid communication with one another, said valve comprising a slider selectively positionable in an opening position, in which it allows the fluid communication between said inlet duct and said outlet duct, and being selectively positionable, against the pressure exerted by the fluid when it is contained in said inlet duct, in a closing position in which the fluid communication between said inlet duct and said outlet duct is interrupted due to direct or indirect action of said slider, said slider being operatively connected to an actuating system comprising a driving element configured to selectively exercise on said slider a desired closing force which tends to bring it towards said closing position, wherein said driving element is configured to exert said closing force on said slider through an elastic element interposed between said driving element and said slider and configured to elastically force said slider towards said closing position, wherein said slider is configured to move in an alternating linear motion along a longitudinal axis of said slider, and said actuating system comprises a second piston at least partially inserted in said main body and movable with alternating motion with respect to the same, according to the same longitudinal axis as said slider, said driving element being configured to selectively exert said desired closing force on said second piston, said second piston slidingly supporting said slider in such a way that the latter can move in said alternating linear motion with respect to said second piston, said elastic element being interposed between said slider and said second piston in such a way that said closing force is transmitted from said second piston to said slider through said elastic element.

2. Valve according to claim 1, wherein said driving element is or comprises at least one actuator element manufactured with a shape memory material and configured to selectively exert on said slider said desired closing force depending on the shape and/or size of said actuator element, said actuating system comprising an electric current generating device operatively connected to said actuator element to selectively modify its shape and/or dimensions through a temperature variation induced by passage of electric current inside said actuator element.

3. Valve according to claim 2, wherein said main body at least partially contains an electronic control board configured to control said electric current generating device.

4. Valve according to claim 1, further comprising a position detector configured to detect a quantity correlated to the position of said slider with respect to said closing position and/or correlated to the closing force exerted by said driving element on said slider.

5. Valve according to claim 1, wherein said second piston comprises a first end and a cavity at its first end, within which said slider is partially inserted.

6. Valve according to claim 1, said actuating system further comprising at least one elastic contrast element configured to interact with said second piston and push the second piston in a direction such as to move said slider away from said closing position.

7. Valve according to claim 6, wherein said at least one elastic contrast element is configured to exert on said slider, directly or indirectly, an opening force which tends to move said slider away from said closing position and bring it into said opening position, wherein it comprises a limit stop suitable for limiting the movement of said slider with respect to said second piston in the direction of said closing force.

8. Valve according to claim 1, further comprising a position detector configured to detect a quantity correlated to the position of said slider with respect to said closing position and/or correlated to the closing force exerted by said driving element on said slider, wherein said position detector configured to detect a quantity correlated to the position of said slider comprises an optical sensor and/or a capacitive sensor and/or an induction sensor and/or a resistive sensor, configured to detect the position of said second piston with respect to said main body, and/or a Hall effect sensor, integral with said main body and configured to detect the position of a magnet mounted on said second piston.

9. Method for dispensing a fluid by means of the proportional emulsion valve according to claim 1, wherein the method comprises the following steps:
   a) actuating said driving element to generate said closing force, until bringing said slider into said closing position;
   b) introducing a fluid at a pressure higher than atmospheric pressure into said inlet duct from the hydraulic circuit of a fluid treatment machine to which said inlet duct is operatively connected;
   c) keeping said slider in said closed position for a desired time interval, not null;
   d) actuating said driving element to remove said slider from said closing position, and to bring it to an opening position in which the pressure exerted on said slider by said fluid and an opposing elastic force exerted by said elastic element on said slider are not balanced against one another and cause a vibration of said slider which generates an emulsion in the fluid supplied by said outlet opening.

10. Method according to claim 9, said driving element being or comprising at least one actuator element manufactured with a shape memory material and configured to selectively exert on said slider said desired closing force depending on the shape and/or size of said actuator element, said actuating system comprising an electric current generating device operatively connected to said actuator element to selectively modify its shape and/or dimensions through a temperature variation induced by passage of electric current inside said actuator element, wherein said actuator element manufactured with a shape memory material is actuated by controlling the electric current supplied by said electric current generator and transmitted to said actuator element by a closed-loop control based on monitoring of a quantity correlated to the closing force exerted by said driving element on said slider and/or correlated to the position of said slider with respect to said closing position.

11. Method, according to claim 9, wherein said driving element is or comprises at least one actuator element manufactured with a shape memory material and configured to selectively exert on said slider said desired closing force depending on the shape and/or size of said actuator element, said actuating system comprising an electric current generating device operatively connected to said actuator element to selectively modify its shape and/or dimensions through a temperature variation induced by passage of electric current inside said actuator element, wherein said actuator element manufactured with a shape memory material is actuated by controlling the electric current supplied by said electric current generator and transmitted to said actuator element by a control based on monitoring of a quantity correlated to the pressure and/or temperature and/or flow of said fluid at a pressure higher than the atmospheric pressure introduced into said inlet duct by the hydraulic circuit of a fluid treatment machine to which said inlet duct is operatively connected.

12. Method according to claim 11, wherein said pressure and/or temperature and/or flow of said fluid are detected by one or more detectors external to said valve.

13. Method according to claim 9, wherein said driving element is or comprises at least one actuator element manufactured with a shape memory material and configured to selectively exert on said slider said desired closing force depending on the shape and/or size of said actuator element, said actuating system comprising an electric current generating device operatively connected to said actuator element to selectively modify its shape and/or dimensions through a temperature variation induced by passage of electric current inside said actuator element, wherein said actuator element manufactured with a shape memory material is actuated by controlling the electric current supplied by said electric current generator and transmitted to said actuator element by a control based on a value, estimated, or assumed on the basis of a certain phase of the process of production and delivery of the fluid, of the pressure and/or temperature and/or flow of said fluid at a pressure higher than the atmospheric pressure introduced into said inlet duct by the hydraulic circuit of a fluid treatment machine wherein said inlet duct is operatively connected.

14. Valve according to claim 1, wherein the hydraulic circuit of said fluid treatment machine is configured to feed coffee-infused fluid to said inlet duct of said valve.

15. Proportional emulsion valve, configured to be used inside a fluid treatment machine, comprising a main body in which an inlet duct is defined, operatively connectable to a hydraulic circuit of a fluid treatment machine and configured to allow entrance into said valve of a fluid at a pressure higher than atmospheric pressure, and an outlet duct operatively connectable to said hydraulic circuit of said machine and configured for expulsion of said fluid from said valve, said inlet duct and said outlet duct being in fluid communication with one another, said valve comprising a slider selectively positionable in an opening position, in which it allows the fluid communication between said inlet duct and said outlet duct, and being selectively positionable, against the pressure exerted by the fluid when it is contained in said inlet duct, in a closing position in which the fluid communication between said inlet duct and said outlet duct is interrupted due to direct or indirect action of said slider, said slider being operatively connected to an actuating system comprising a driving element configured to selectively exercise on said slider a desired closing force which tends to bring it towards said closing position, wherein said driving element is configured to exert said closing force on said slider through an elastic element interposed between said driving element and said slider and configured to elastically force said slider towards said closing position, wherein said inlet duct and said outlet duct are in fluid communication with one other through a connecting chamber within which said slider is at least partially inserted and movable with alternating motion, through an access opening of said connecting chamber, said valve comprising a gasket, elastically deformable, configured to avoid leakage of fluid from said connecting chamber via said access opening and at the same time to fully wrap a portion of said slider which enters said connecting chamber, elastically deforming until being interposed between said slider and an end of said inlet duct communicating with said connecting chamber, when said slider is in said closing position, so as to watertight close said end, and watertight blocking the passage of fluid from said inlet duct to said connecting chamber.

* * * * *